United States Patent
Hashiba

(10) Patent No.: US 7,613,567 B2
(45) Date of Patent: Nov. 3, 2009

(54) METHOD FOR CORRECTING THE OUTPUTS OF VEHICLE BEHAVIOR SENSOR

(75) Inventor: Hitoshi Hashiba, Nissin (JP)

(73) Assignee: Advics Co., Ltd., Kariya, Aichi (JP)

( * ) Notice: Subject to any disclaimer, the term of this patent is extended or adjusted under 35 U.S.C. 154(b) by 96 days.

(21) Appl. No.: 11/304,670

(22) Filed: Dec. 16, 2005

(65) Prior Publication Data

US 2006/0142920 A1    Jun. 29, 2006

(30) Foreign Application Priority Data

Dec. 24, 2004    (JP) ............................. 2004-374051

(51) Int. Cl.
*G01C 21/06* (2006.01)
*G01C 25/00* (2006.01)
(52) U.S. Cl. .................. 701/220; 702/92; 702/87; 702/141; 702/153; 701/116
(58) Field of Classification Search ................ 701/116, 701/220; 702/141, 153, 87, 92
See application file for complete search history.

(56) References Cited

U.S. PATENT DOCUMENTS 3,597,598 A * 8/1971 McAllister et al. .......... 701/220

(Continued)

FOREIGN PATENT DOCUMENTS

DE    101 64 108 A1    7/2003

(Continued)

OTHER PUBLICATIONS

"Calibration of orientation measurement systems based on tilt sensors and compasses", J. Clijnen, D. Reynaerts, H. Van Brussel, EUSPEN, Eindhoven, The Netherlands, 2002, 443-446. Found online: http://www.mech.kuleuven.be/micro/pub/pen/Paper_euspen_2002.pdf.*

(Continued)

*Primary Examiner*—Eric Bolda
*Assistant Examiner*—Ari M Diacou
(74) *Attorney, Agent, or Firm*—Buchanan Ingersoll & Rooney PC

(57) ABSTRACT

First and second acceleration sensor elements for detecting the acceleration of a vehicle in the direction in which the vehicle travels, and the acceleration of the vehicle in the direction transverse to the travel direction of the vehicle are mounted on a sensor substrate which is mounted on a control substrate of a vehicle control device. With the sensor substrate positioned such that the sensing directions of the respective sensor elements are perpendicular to or parallel to the vertical line, the outputs of the respective sensor elements are detected as zero errors or gain errors. The sensor substrate is then mounted on a vehicle and with the vehicle placed on a horizontal surface, a signal is sent to an electronic control unit (ECU) of the vehicle control device so that the ECU can recognize that the vehicle is horizontal. Based on the outputs from the first and second sensor elements at this time, the deviation angles of the sensor elements about the X-axis and Y-axis directions are calculated. The acceleration in the X-axis direction is calculated from signals from wheel speed sensors. Based on the deviation angles and the acceleration in the X-axis direction, the deviation angle of the sensor elements about the Z-axis is calculated. Based on the thus calculated deviation angles and zero errors and/or gain errors, the outputs of the sensor elements are corrected to obtain true accelerations in the X-axis and Y-axis directions.

12 Claims, 8 Drawing Sheets

U.S. PATENT DOCUMENTS

| | | | | | |
|---|---|---|---|---|---|
| 4,060,718 | A | * | 11/1977 | Huddle | 702/2 |
| 4,179,739 | A | * | 12/1979 | Virnot | 701/117 |
| 4,347,730 | A | * | 9/1982 | Fisher et al. | 73/1.76 |
| 4,601,206 | A | * | 7/1986 | Watson | 73/510 |
| 4,662,209 | A | * | 5/1987 | Brown | 340/854.2 |
| 4,675,820 | A | * | 6/1987 | Smith et al. | 701/220 |
| 4,847,769 | A | * | 7/1989 | Reeve | 701/23 |
| 4,870,588 | A | * | 9/1989 | Merhav | 701/220 |
| 4,870,602 | A | * | 9/1989 | Baumker | 702/93 |
| 4,912,662 | A | * | 3/1990 | Butler et al. | 702/154 |
| 5,001,647 | A | * | 3/1991 | Rapiejko et al. | 701/220 |
| 5,060,504 | A | * | 10/1991 | White et al. | 73/514.37 |
| 5,172,323 | A | * | 12/1992 | Schmidt | 701/220 |
| 5,184,304 | A | * | 2/1993 | Huddle | 701/220 |
| 5,335,190 | A | * | 8/1994 | Nagle et al. | 702/154 |
| 5,355,316 | A | * | 10/1994 | Knobbe | 701/220 |
| 5,422,817 | A | * | 6/1995 | Tazartes et al. | 702/93 |
| 5,479,161 | A | * | 12/1995 | Keyes et al. | 340/870.04 |
| 5,526,263 | A | * | 6/1996 | Tanaka et al. | 701/70 |
| 5,531,115 | A | * | 7/1996 | Erdley | 73/504.02 |
| 5,686,665 | A | | 11/1997 | Hara et al. | |
| 5,736,923 | A | * | 4/1998 | Saab | 340/429 |
| 5,991,692 | A | * | 11/1999 | Spencer et al. | 701/217 |
| 6,008,731 | A | * | 12/1999 | Capan | 340/665 |
| 6,029,111 | A | * | 2/2000 | Croyle | 701/207 |
| 6,038,495 | A | * | 3/2000 | Schiffmann | 701/1 |
| 6,087,950 | A | * | 7/2000 | Capan | 340/665 |
| 6,185,485 | B1 | * | 2/2001 | Ashrafi et al. | 701/1 |
| 6,443,537 | B2 | | 9/2002 | Koyama | |
| 6,532,419 | B1 | * | 3/2003 | Begin et al. | 701/220 |
| 6,738,714 | B2 | * | 5/2004 | McCall et al. | 701/220 |
| 6,823,279 | B1 | * | 11/2004 | Nadkarni et al. | 702/104 |
| 6,859,700 | B2 | | 2/2005 | Bolzmann et al. | |
| 6,859,747 | B2 | * | 2/2005 | Yutkowitz | 702/105 |
| 6,959,240 | B2 | * | 10/2005 | Okamoto | 701/70 |
| 2003/0033105 | A1 | * | 2/2003 | Yutkowitz | 702/105 |
| 2003/0144808 | A1 | * | 7/2003 | Savard | 702/104 |
| 2003/0182042 | A1 | * | 9/2003 | Watson et al. | 701/45 |
| 2003/0209070 | A1 | * | 11/2003 | Dosch et al. | 73/382 G |
| 2003/0236604 | A1 | | 12/2003 | Lu et al. | |
| 2004/0102888 | A1 | | 5/2004 | Burgdorf et al. | |
| 2004/0163470 | A1 | | 8/2004 | Babala et al. | |
| 2004/0236474 | A1 | * | 11/2004 | Chowdhary et al. | 701/1 |
| 2006/0149489 | A1 | * | 7/2006 | Joublin et al. | 702/92 |

FOREIGN PATENT DOCUMENTS

| | | |
|---|---|---|
| JP | 7-242112 A | 9/1995 |
| JP | 8-304448 A | 11/1996 |
| JP | 2001-260846 | 9/2001 |
| JP | 2004-506572 | 3/2004 |
| JP | 2004-150900 A | 5/2004 |
| WO | WO 02/16179 | 2/2002 |

OTHER PUBLICATIONS

Zhiyu Xiang, Umit Ozguiner. A 3D Positioning System for Off-road Autonomous Vehicles. This paper appears in: Intelligent Vehicles Symposium, 2005. Proceedings. IEEE. Publication Date: Jun. 6-8, 2005. On pp. 130-135.* euspen/Vision—conference proceedings. European Society for Precision Engineering and Nanotechnology. Downloaded from: http://www.euspen.org/default.asp?contentid=341&langid=1 on Apr. 14, 2008 10:54:30 AM Last updated: Jun. 2, 2008 (Feb. 6$^{th}$).*

Micro and Precision Engineering Research Group Publications. Copyright © Katholieke Universiteit Leuven | Comments on content: Jan Peirs. Downloaded from: http://www.mech.kuleuven.be/micro/pub/pen/ on Apr. 14, 2008 10:56:54 AM. Last update: Aug. 17, 2005.*

Eindhoven 2003. © EUSPEN. http://www.euspen.com/content/docs/Docs%202006/Eindhoven%202003.pdf. Downloaded on Apr. 14, 2008.*

B. Barshan and H. F. Durrant-Whyte, Inertial navigation systems mobile robots, IEEE Trans. Rob. Autom. 11(3), 1995 pp. 328-342. http://ieeexplore.ieee.org/stamp/stamp.jsp?arnumber=00388775.*

Borenstein, J., Everett, H.R., Feng, L., & Wehe, D. (1997). Mobile robot positioning: Sensors and techniques. J Robot Syst, 14, 231-249. http://www3.interscience.wiley.com/cgi-bin/fulltext/51787/PDFSTART.*

Official Action issued by German Patent Office together with English language translation of Official Action.

Notice of Reasons for Rejection (Office Action) dated Jul. 7, 2009 in corresponding Japanese Application No. 2004-374051 and partial English translation.

* cited by examiner

Fig.3

$Gy \cos\theta z + Gx \sin\theta z + Gz \sin\theta x + \delta Gy = Gy_0 \dots (1)$ $Gy \sin\theta z + Gx \cos\theta z + Gz \sin\theta y + \delta Gx = Gx_0 \dots (2)$ where $\delta Gy$: zero shift inherent to the sensor Sy;

$\delta Gx$: zero shift inherent to the sensor Sx;

$\{Gy \cos\theta z + Gx \sin\theta z + Gz \sin\theta x\}$: total of component forces of the true accelerations of the vehicle in the X-, Y- and Z-axis directions as detected by the Y-axis acceleration sensor Sy; and $\{Gy \sin\theta z + Gx \cos\theta z + Gz \sin\theta y\}$: total of component forces of the true accelerations of the vehicle in the X-, Y- and Z-axis directions as detected by the X-axis acceleration sensor Sx $Gy \cos\theta z + Gx \sin\theta z + Gz \sin\theta x = Gy_1 = Gy_0 - \delta Gy \dots (3)$ $Gy \sin\theta z + Gx \cos\theta z + Gz \sin\theta y = Gx_1 = Gx_0 - \delta Gx \dots (4)$ $Gz \sin\theta x = Gy_2 \dots (5)$ $Gz \sin\theta y = Gx_2 \dots (6)$ From $\sin\theta x = Gy_2/Gz = Gy_2/1G \quad \theta x = \sin^{-1}(Gy_2/1G) \dots (7)$ From $\sin\theta y = Gx_2/Gz = Gx_2/1G \quad \theta y = \sin^{-1}(Gx_2/1G) \dots (8)$ $Gy \cos\theta z + Gx \sin\theta z = Gy_1 - Gz \sin\theta x = Gy_3 \dots (9)$ $Gy \sin\theta z + Gx \cos\theta z = Gx_1 - Gz \sin\theta y = Gx_3 \dots (10)$ Determining the gain of $S_Z$ Determining the gain of $S_Y$ Determining the gain of $S_X$

METHOD FOR CORRECTING THE OUTPUTS OF VEHICLE BEHAVIOR SENSOR

BACKGROUND OF THE INVENTION

This invention relates to a method for correcting the outputs of vehicle behavior sensors mounted in an electronic control unit of a vehicle control device mounted in a vehicle brake hydraulic pressure control system such as an antilock brake system (ABS), a traction control system (TRC) or an electronic stability control system (ESC), and such a vehicle control device in which are mounted vehicle behavior sensors of which the outputs have been corrected.

With sophistication of today's motor vehicles and for safer travel, an increasing number of today's motor vehicles are equipped with vehicle behavior sensors. Such vehicle behavior sensors detect the behavior of a vehicle in the travel direction of the vehicle, the direction transverse to the travel direction, the vertical direction and other directions. Based on signals from these sensors, the vehicle control device controls the brake hydraulic pressure so that the vehicle will travel safely and smoothly.

Such vehicle behavior sensors include acceleration sensors, which detect accelerations in predetermined sensing directions (including gravity).

In order for such vehicle behavior sensors to accurately detect the behavior of the vehicle, it is essential that the sensing direction of each sensor coincide with the direction in which it is desired to detect the behavior of the vehicle, such as the travel direction of the vehicle (X-axis direction) or the direction transverse to the travel direction (Y-axis direction).

But practically, no matter how carefully such vehicle behavior sensors are mounted on a vehicle, it is difficult to arrange such sensors such that the sensing direction of each sensor precisely coincides with the intended direction of the vehicle. Especially if such vehicle behavior sensors are mounted e.g. in a vehicle control device of the above-described type, it is more difficult to position the sensors such that the sensing direction of each sensor precisely coincides with the intended direction of the vehicle than when mounting such sensors directly on the vehicle frame.

In order to overcome this difficulty, JP patent publication 2004-506572 proposes to apply accelerations and pivoting motions to a vehicle control device of the above-described type which carries vehicle behavior sensors, compare the outputs of the respective sensors based on such accelerations or pivoting motions with theoretical output values which the respective sensors are supposed to produce if the sensors are positioned precisely as required, and correct the outputs of the sensors based on the difference between the actual outputs of the sensors and the theoretical values.

However, vehicle behavior sensors are ordinarily mounted in an onboard device such as a vehicle control device, and then the onboard device is mounted on a vehicle. Thus, while the method disclosed in the above publication can correct the outputs of the sensors when the sensors are mounted in the onboard device, the method cannot correct the outputs of the sensors with the onboard device mounted on the vehicle. The theoretical values are not clearly defined, either. Also, this publication fails to consider gain errors inherent to respective sensors.

The outputs of conventional vehicle behavior sensors were therefore not sufficiently reliable and more accurate vehicle behavior sensors are desired.

An object of the present invention is to more accurately detect the behavior of a vehicle.

SUMMARY OF THE INVENTION

In view of the fact that the overall behavior of a vehicle is detectable almost sufficiently by detecting the behavior of the vehicle at least in the travel direction of the vehicle (X-axis direction) and the direction transverse to the travel direction (Y-axis direction), according to the present invention, first and second vehicle behavior sensor elements for detecting the behavior of a vehicle A in the X-axis and Y-axis directions, respectively, are mounted on the vehicle, calculation is made of the deviation $\theta x$ of the sensor elements about the X-axis of the vehicle in the YZ plane (roll), and the deviation $\theta y$ of the sensor elements about the Y-axis of the vehicle in the XZ plane (pitch), with respect to the horizontal plane, and the outputs of the first and second sensor elements while the vehicle is traveling are corrected based on the calculated deviations $\theta x$ and $\theta y$.

Since the deviations are detected after the sensor elements have been mounted on the vehicle, the outputs of the sensor elements can be corrected with high accuracy based on the deviations $\theta x$ and $\theta y$.

Besides the deviations $\theta x$ and $\theta y$, the deviation $\theta z$ of the first and second sensor elements about the Z-axis in the XY plane (yaw) may be calculated. With this arrangement, the outputs of the sensor elements can be more accurately corrected based on the deviations $\theta x$ and $\theta y$ and the deviation $\theta z$.

While the vehicle is traveling in a straight line on a horizontal surface, the acceleration Gy in the Y-axis direction is zero. Thus, from the outputs of the vehicle behavior sensor elements, and from the fact that the true acceleration of the vehicle in the Y-axis direction is zero, or from the acceleration $G_0$ in the travel direction of the vehicle as detected based on signals from onboard wheel speed sensors while the vehicle is traveling in a straight line on a horizontal surface, and the deviations $\theta x$ and $\theta y$, it is possible to calculate the deviations $\theta z$ of the vehicle behavior sensor elements. Based on the thus calculated deviations $\theta x$, $\theta y$ and $\theta z$, it is possible to correct the outputs of the vehicle behavior sensor elements.

If the vehicle behavior sensor elements are acceleration sensor elements, the outputs of the sensor elements are affected by gravity, and vary according to their deviation angles with respect to the vertical line.

Thus, the deviations of the vehicle behavior sensor elements relative to the travel direction of the vehicle and the direction transverse to the travel direction of the vehicle can be calculated from the outputs of the vehicle behavior sensor elements while the vehicle is stationary with the travel direction and the direction transverse to the travel direction perpendicular to the vertical line. Based on the thus calculated deviations, it is possible to correct the outputs of the vehicle behavior sensor elements while the vehicle is traveling.

While a vehicle is traveling in a straight line on a horizontal surface (and thus is producing no yaw moment), it is possible to calculate the acceleration of the vehicle in the travel direction (X-axis direction) based on signals from wheel speed sensors, with which most of today's vehicles are equipped.

By comparing the acceleration of the vehicle calculated based on signals from the wheel speed sensors while the vehicle is traveling with the output of the acceleration sensor element for detecting the acceleration in the travel direction of the vehicle, it is possible to detect errors in the output of this acceleration sensor element and thus to correct its output.

Such vehicle behavior sensor elements are typically mounted on a substrate and the substrate is mounted on a vehicle. Since the substrate is a plate member, the vehicle behavior sensor elements can be easily mounted on the substrate such that the sensing direction of each sensor element is parallel to or perpendicular to the mounting surface of the substrate. Thus, by positioning the substrate such that its mounting surface is perpendicular to or parallel to the vertical line, the sensing directions of the respective vehicle behavior sensor elements will also be closely perpendicular to or parallel to the vertical line.

In this state, errors in the outputs of the vehicle behavior sensor elements are detectable. Since such errors are small, they can be easily corrected. It is much easier to position the substrate such that its mounting surface is perpendicular to or parallel to the vertical line than to position the individual sensor elements such that their sensing directions are perpendicular to or parallel to the vertical line.

According to the present invention, it is possible to correct the outputs of vehicle behavior sensor elements with high accuracy even if the sensor elements are not positioned exactly as intended. Thus, it is possible to accurately detect the behavior of the vehicle from the outputs of the sensor elements.

BRIEF DESCRIPTION OF THE DRAWINGS

Other features and objects of the present invention will become apparent from the following description made with reference to the accompanying drawings, in which:

FIG. 3 shows equations used to correct the outputs of vehicle behavior sensor elements according to the present invention;

DETAILED DESCRIPTION OF THE PREFERRED EMBODIMENTS

Figure 1:
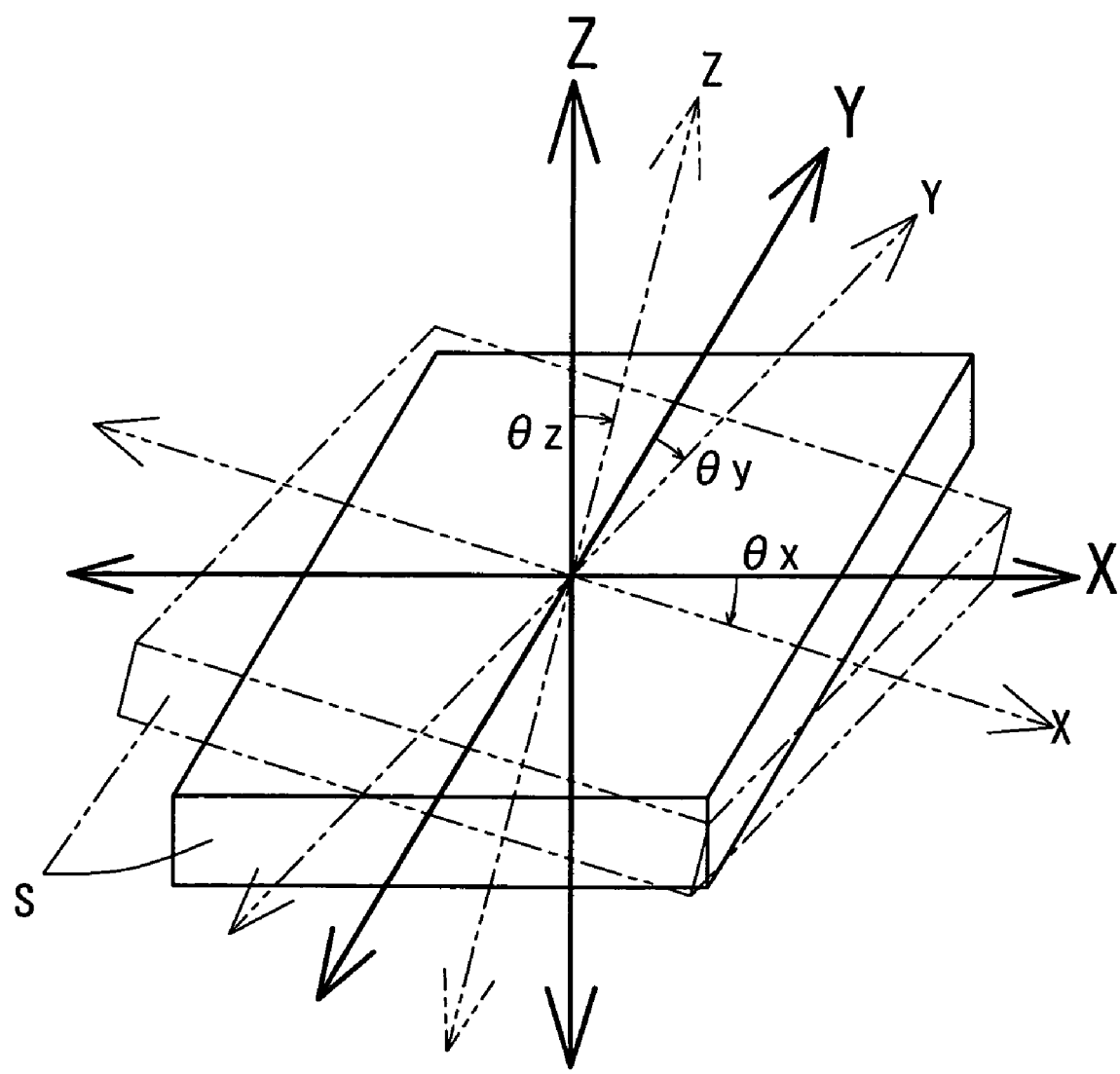
FIG. 1 is a schematic view of a vehicle behavior sensor element showing how the sensor element is inclined.

From one aspect of the invention, there is provided a method for correcting outputs of a vehicle behavior sensor assembly of a vehicle control device including an electronic control unit, the vehicle behavior sensor assembly S comprising a first acceleration sensor element Sx for detecting an acceleration of a vehicle A on which the vehicle control device is mounted in an X-axis direction in which the vehicle travels, and a second acceleration sensor element Sy for detecting an acceleration of the vehicle in a Y-axis direction that is perpendicular to the X-axis direction, the electronic control device being configured to control the behavior of the vehicle based on signals from the first and second acceleration sensor elements, the method comprising mounting the sensor assembly on the vehicle A, keeping the vehicle A in a stationary state with the X-axis and Y-axis directions horizontal, feeding a signal indicating that the vehicle is horizontal to the electronic control unit, calculating first and second deviation angles θx and θy of sensing directions of the first and second sensor elements Sx and Sy about the X-axis direction in a YZ plane that is perpendicular to the X-axis direction and about the Y-axis direction in an XZ plane that is perpendicular to the Y-axis direction based on outputs from said first and second sensor elements Sx and Sy, respectively, and correcting outputs of the first and second sensor elements while the vehicle is traveling based on the first and second deviation angles θx and θy.

This method may further comprise detecting a third deviation angle θz of each of the first and second sensor elements about a Z-axis direction that is perpendicular to both the X-axis and Y-axis directions in an XY plane that is perpendicular to the Z-axis direction, based on the first and second deviation angles θx and θy, outputs of the first and second sensor elements while the vehicle is traveling in the X-axis direction on a horizontal surface, and one of an acceleration of the vehicle in the Y-axis direction (which is zero while the vehicle traveling in the X-axis direction on a horizontal surface) and an acceleration of the vehicle in the X-axis direction as calculated based on signals from wheel speed sensors mounted on the vehicle, while the vehicle is traveling in the X-axis direction on a horizontal surface, wherein the outputs of the first and second sensor elements while the vehicle is traveling are corrected based on the first, second and third deviation angles.

From another aspect of the invention, there is provided a method for correcting outputs of a vehicle behavior sensor assembly of a vehicle control device including an electronic control unit, the vehicle behavior sensor assembly comprising a first acceleration sensor element for detecting an acceleration of a vehicle on which the vehicle control device is mounted in an X-axis direction in which the vehicle travels, a second acceleration sensor element for detecting an acceleration of the vehicle in a Y-axis direction that is perpendicular to the X-axis direction, and a third acceleration sensor element for detecting an acceleration of the vehicle in a Z-axis direction that is perpendicular to both the X-axis and Y-axis direction, the electronic control device being configured to control the behavior of the vehicle based on signals from the first, second and third acceleration sensor elements, the method comprising mounting the sensor assembly on the vehicle, keeping the vehicle in a stationary state with the X-axis and Y-axis directions horizontal and the Z-axis directions parallel to the vertical line, feeding a signal indicating that the vehicle is horizontal to the electronic control unit, calculating first, second and third deviation angles of sensing directions of the first, second and third sensor elements about the X-axis direction in a YZ plane that is perpendicular to the X-axis direction, about the Y-axis direction in an XZ plane that is perpendicular to the Y-axis direction, and about the Z-axis direction in an XY plane that is perpendicular to the Z-axis direction, respectively, and correcting outputs of the first. second and third sensor elements while the vehicle is traveling based on the first, second and third deviation angles.

In this arrangement, it is not necessary to calculate the deviation angle of the first and second sensor elements about the Z-axis direction using wheel speed sensors. But such deviation angles may be calculated using information from the wheel speed sensors, too.

Either of the above two methods may further comprise mounting the vehicle behavior sensor assembly on a substrate such that the sensing directions of the first and second sensor elements are parallel to a surface of the substrate, positioning the substrate such that the surface is perpendicular to the vertical line, or positioning the substrate such that the sensing direction of each of the sensor elements is parallel to the vertical line, and detecting outputs of the respective sensor elements. By comparing these outputs with the outputs of the sensor elements if their respective sensing directions are precisely perpendicular to or parallel to the vertical line, the sensor outputs are corrected. Since errors in the output at this time are small, the sensor outputs can be corrected easily.

Preferably, vehicle behavior sensor elements are mounted on a vehicle at or near its center of gravity. If the detection signals from these sensor elements are used by e.g. ESC to control the vehicle by adjusting brake hydraulic pressure, the detection signals from these sensor elements have to be transmitted to the vehicle control device in the engine room through a wire harness.

The wire harness itself adds to the cost of the vehicle. The cost for measures to block noise during signal transmission through the wire harness also adds to the cost of the vehicle. If the vehicle behavior sensor elements are mounted in the electronic control unit of the vehicle control device, it is possible to eliminate the need for a wire harness and thus to reduce the cost of the entire vehicle.

Figure 4:
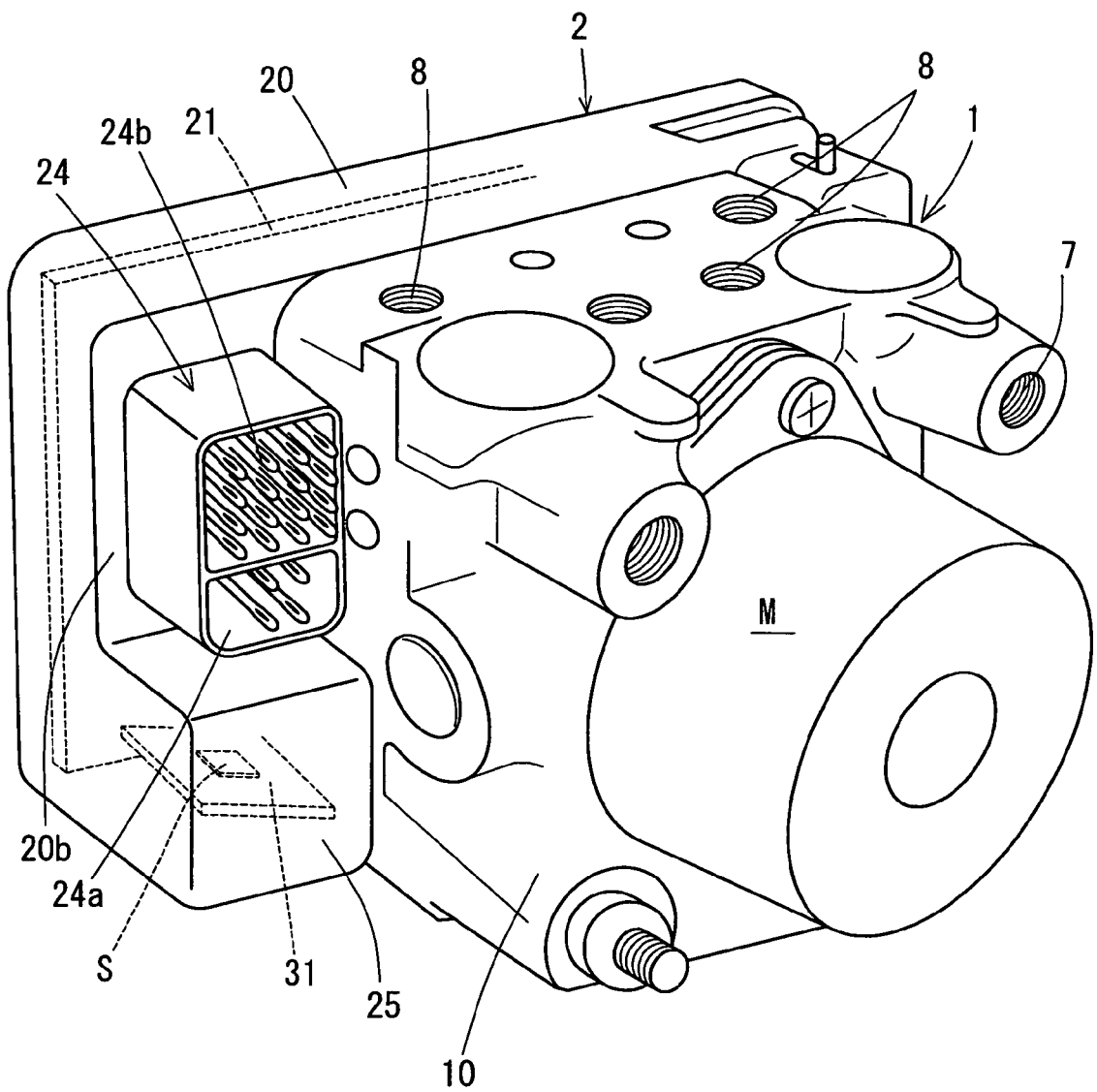
FIG. 4 is a perspective view of an embodiment.
Figure 5:
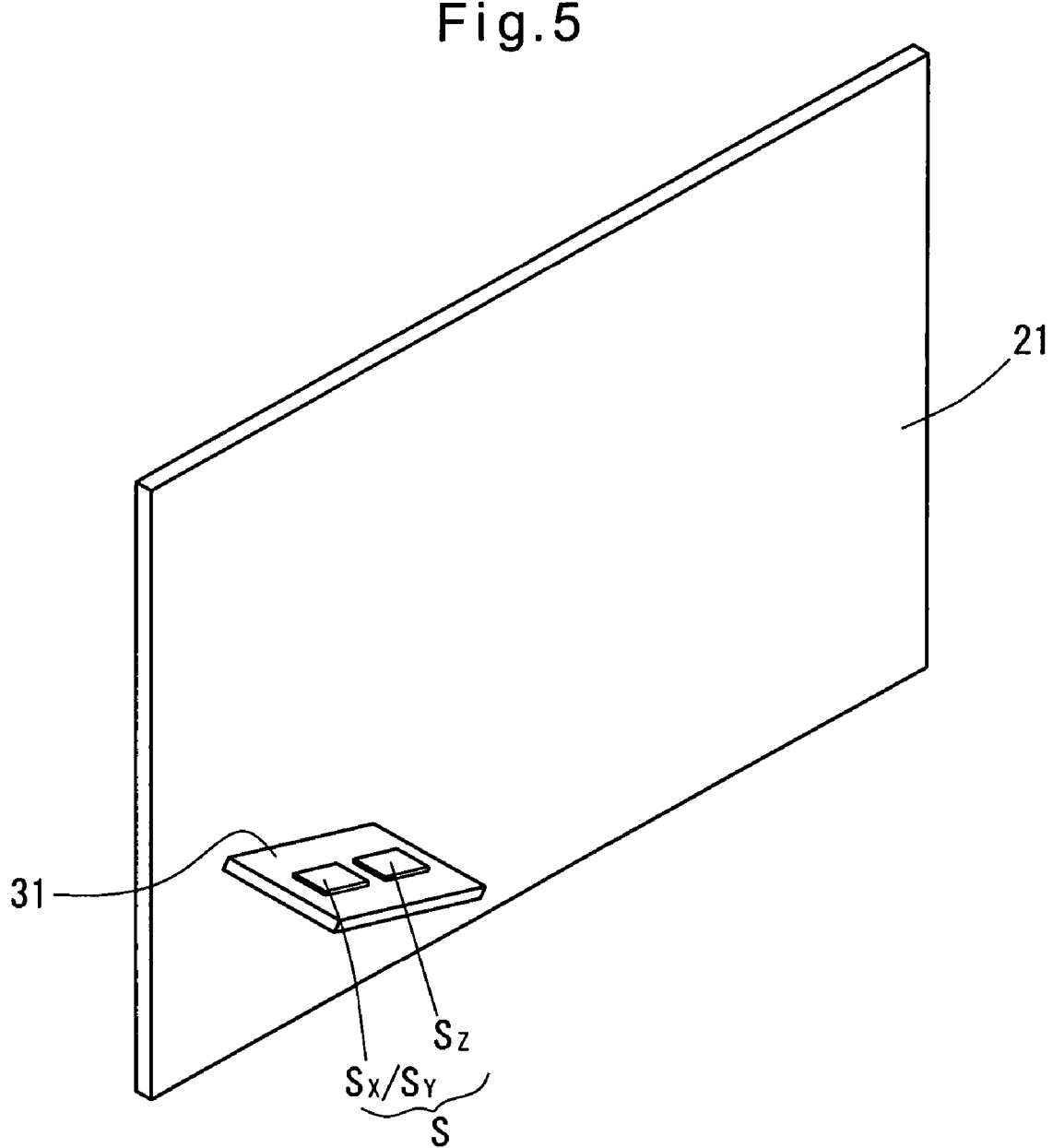
FIG. 5 is a perspective view of a control substrate of the embodiment.
Figure 6:
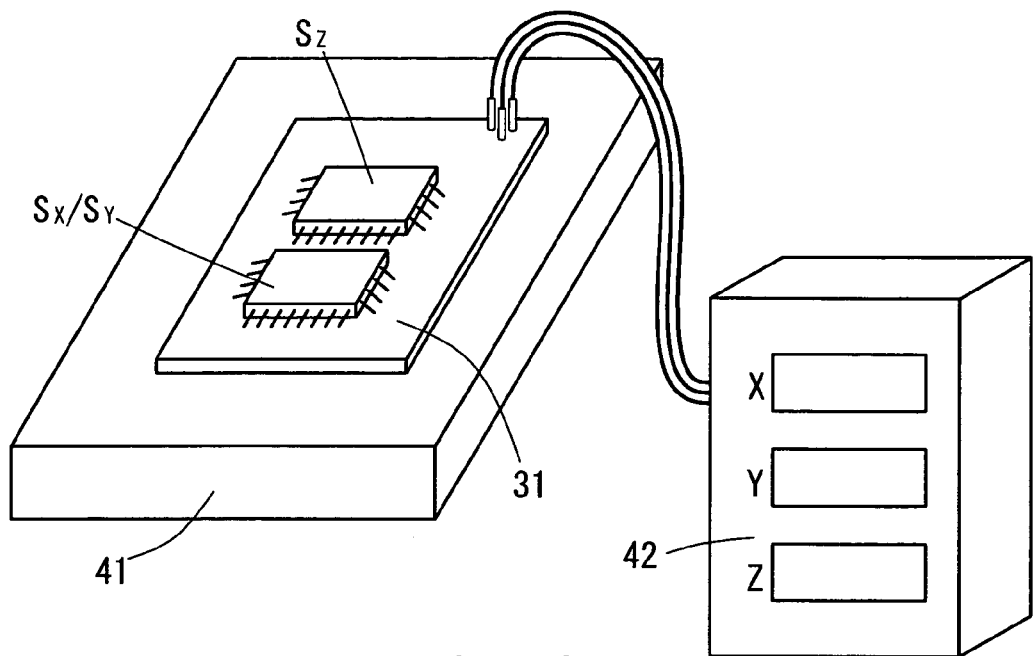
FIG. 6 shows how the outputs of acceleration sensor elements are measured with an acceleration measuring device.

If the vehicle behavior sensor elements are mounted in the vehicle control device, it is typically mounted on a sensor substrate which is mounted on a control substrate in an upright position relative to the control substrate (see FIGS. 4 and 5). With this arrangement, the sensor substrate can be easily positioned horizontally when the vehicle control device is mounted on a vehicle.

Even if the vehicle control device is not mounted on the vehicle with high positional accuracy, it is possible to adjust the positions of the vehicle behavior sensor elements by changing the position of the sensor substrate, thereby improving the detection accuracy of the sensor elements.

Figure 2A:
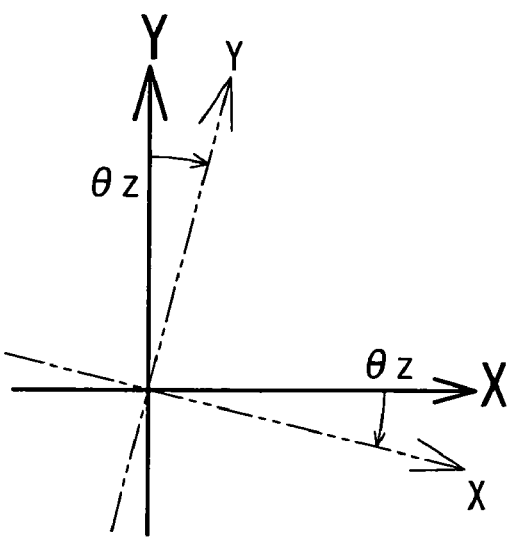
FIG. 2A shows the deviation angle of the sensor element of FIG. 1 about the Z-axis in the XY plane.
Figure 2B:
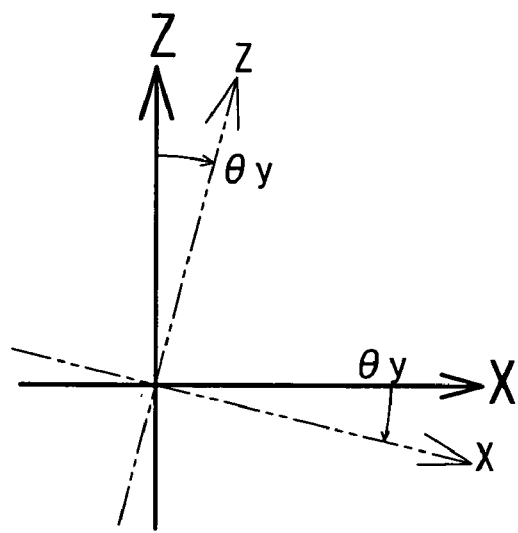
FIG. 2B shows the deviation angle of the sensor element of FIG. 1 about the Y-axis in the XZ plane.
Figure 2C:
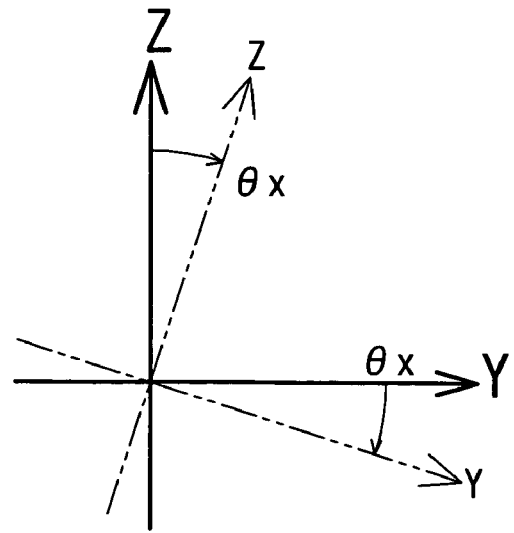
FIG. 2C shows the deviation angle of the sensor element of FIG. 1 about the X-axis in the YZ plane.

Now referring to FIGS. 1 to 3, an algorithm for correcting the outputs of a vehicle behavior sensor assembly S comprising an acceleration sensor element Sx for detecting an acceleration in an X-axis direction which is a travel direction of the vehicle, and an acceleration sensor element Sy for detecting an acceleration in a Y-axis direction. Based on the signals from the sensor elements Sx and Sy (which represent accelerations in the X-axis and Y-axis directions), the behavior of the vehicle is determined With the vehicle behavior sensor elements Sx and Sy mounted on a vehicle, if each vehicle behavior sensor element Sx or Sy is inclined from a position where its sensing direction x and the direction y perpendicular to the sensing direction x are both perpendicular to the vertical line and the direction z perpendicular to directions x and y is parallel to the vertical line to a position shown by chain lines in FIGS. 2A to 2C, where the directions x and y are inclined about the Z-axis by an angle of $\theta z$ in the XY plane (FIG. 2A; yaw), the directions y and z are inclined about the X-axis by an angle of $\theta x$ in the YZ plane (FIG. 2C; roll), and directions x and z are inclined about the Y-axis by an angle of $\theta y$ in the XZ plane (FIG. 2B; pitch), the outputs $Gx_0$ and $Gy_0$ of the respective sensor elements Sx and Sy are given by equations (1) and (2) in FIG. 3, where Gx, Gy and Gz are the true accelerations of the vehicle in the X-, Y- and Z-axis directions, respectively.

The zero errors $\delta Gx$ and $\delta Gy$ in equations (1) and (2) are the outputs of the sensor elements Sx and Sy, respectively, when the sensing directions of the respective sensor elements Sx and Sy are completely horizontal ($\theta x = \theta y = 0$).

In addition to or instead of the zero errors, gain errors, which are the outputs of the respective sensor elements Sx and Sy when the sensor elements are positioned such that their sensing directions are completely parallel to the vertical line, may be used to correct the output of the sensor elements.

Thus, in equations (3) and (4), the values $Gy_1$ and $Gx_1$ represent the true accelerations in the sensing directions of the respective sensor elements Sx and Sy.

When the vehicle on which the sensor elements Sx and Sy are mounted are stationary on a completely horizontal surface (with its X-axis and Y-axis perpendicular to the vertical line), the acceleration Gx and Gy, i.e. the true accelerations of the vehicle in the X-axis and Y-axis directions are both zero. Thus, the true accelerations $Gy_2$ and $Gx_2$ in the sensing directions of the respective sensor elements Sy and Sx are given by equations (5) and (6).

Since the true acceleration Gz in the Z-axis direction in this state is 1G, the deviations $\theta x$ and $\theta y$ can be calculated from equations (7) and (8).

Equations (3) and (4) can be transformed into equations (9) and (10). In equations (9) and (10), while the vehicle is traveling in a straight line on a horizontal surface, $Gy_1$ and $Gx_1$ are known from equations (3) and (4), Gz is 1G, and $\theta x$ and $\theta y$ are known from equations (7) and (8), so that $Gy_3$ and $Gx_3$ can be calculated from equations (9) and (10). Further, while the vehicle is traveling in a straight line on a horizontal surface, the true acceleration Gy in the Y-axis direction is zero. Thus, in equations (9) and (10), unknown quantities are Gx and $\theta z$, which can be calculated from equations (9) and (10).

Otherwise, while the vehicle is traveling in a straight line on a horizontal surface, the true acceleration Gx in the X-axis direction may be calculated from wheel speed sensors mounted on the vehicle to calculate Gy and $\theta z$ from equations (9) and (10).

Since $\theta x$, $\theta y$ and $\theta z$ are calculated in the above manner, the true acceleratios Gx and Gy while the vehicle is traveling can be calculated from equations (1) and (2).

The sensor assembly S may include, besides the acceleration sensor elements Sx and Sy, an additional sensor such as a yaw rate sensor.

The method according to the present invention is now described in detail with reference to FIGS. 4 to 8.

As shown in FIG. 4, a vehicle control device for controlling the vehicle by adjusting brake hydraulic pressure comprises a hydraulic unit 1, a motor M mounted on one side of the hydraulic unit 1, and an electronic control unit 2 mounted on the other side of the hydraulic unit 1. The hydraulic unit 1 includes an aluminum housing 10 in which are mounted a reservoir, a pump and control valves for pressure increase and pressure reduction.

The electronic control unit 2 includes a casing 20 of a synthetic resin in which a control substrate 21 as described is mounted to control the control valves. The control substrate 21 is electrically connected to the motor M and the control valves to control them based on signals from wheel speed sensors, yaw rate sensors and other sensors (as disclosed in JP patent publication 2001-260846). In FIG. 4, numerals 7 and 8 indicate master cylinder ports and wheel cylinder ports, respectively.

In this vehicle control device, the pressure increase control valves are normally kept open and the pressure reduction control valves are normally kept closed. When the brake pedal is depressed, hydraulic pressure is transmitted from the master cylinder through the master cylinder ports 7, pressure increase control valves and wheel cylinder ports 8 into wheel cylinders, thereby braking the corresponding wheels.

The hydraulic unit 1 is sized so as not to protrude from the mounting surface 20b of the casing 20 of the electronic control unit 2, while the mounting surface 20b protrudes leftwardly in FIG. 4 from the hydraulic unit 1.

The control substrate 21 in the electronic control unit 2 is a conventional one, comprising a printed circuit board and electronic parts mounted on the circuit board. The control substrate 21 extends into a space defined by the portion of the casing 20 protruding from the housing 10 of the hydraulic unit 1.

On the mounting surface 20b of the portion of the casing 20 of the electronic control unit that protrudes from the housing 10 of the hydraulic unit 1, a connector assembly 24 for the electronic control unit which comprises a power source connector 24a and a control connector 24b (provided above the connector 24a in FIG. 4) is mounted. In the embodiment, in order to minimize the size of the connector assembly 24, the control connector 24b is a multiplex transmission type and includes only 16 pins. But the number of pins of the connector 24b is not limited to 16.

The mounting surface 20b includes a bulge 25 under the connector assembly 24. In the bulge 25, a vehicle behavior sensor assembly S is mounted. The vehicle behavior sensor assembly S is mounted on a small substrate (sensor substrate) 31 that is in turn mounted on the control substrate 21 in an upright position relative to the control substrate 21. The sensor substrate 31 may carry an electronic circuit associated with the vehicle behavior sensor assembly S.

By mounting the vehicle behavior sensor assembly S in the bulge 25, which is formed on the mounting surface 20b of the casing of the electronic control unit under the connector assembly 24, since the bulge 25 does not protrude from the substantially square outer contour of the vehicle control device, the vehicle control device will take up less space than a conventional vehicle control device which carries a vehicle behavior sensor assembly in a bulge formed on the back of the casing 20.

The vehicle behavior sensor assembly S comprises an acceleration sensor element Sx for detecting an acceleration in the X-axis direction of the vehicle which is the direction in which the vehicle travels, and an acceleration sensor element Sy for detecting an acceleration in the Y-axis direction of the vehicle which is the direction transverse to the X-axis direction. With the sensor substrate 31 mounted on the control substrate 21, the sensor substrate 31 can be inclined about any of the X-axis, Y-axis and Z-axis. Once the sensor substrate 31 is inclined to a desired position, the sensor substrate 31 is fixed to the control substrate 21.

A yaw rate sensor may be mounted on the sensor substrate 31 or on a different portion of the vehicle.

Description is now made of how the outputs of the vehicle behavior sensor assembly S are corrected.

The sensor elements Sx and Sy are mounted on the sensor substrate 31 with their sensing directions parallel to the surface of the sensor substrate 31.

The sensor substrate 31 is then mounted on a horizontal jig 41 so as to be completely horizontal (perpendicular to the vertical line). In this state, using an acceleration measuring device 42, the outputs $Gx_{0-1}$ and $Gy_{0-1}$ of the sensor elements Sx and Sy are measured.

Since the sensing directions of both sensor elements Sx and Sy are completely horizontal, the outputs $Gx_{0-1}$ and $Gy_{0-1}$ are both supposed to be zero. But if the outputs $Gx_{0-1}$ and $Gy_{0-1}$ are not zero, they are determined to be zero errors inherent to the respective sensor elements Sx and Sy and used as zero errors $\delta Gx$ and $\delta Gy$ in equations in FIG. 3.

Figure 8A:
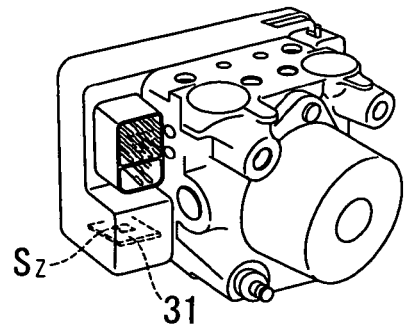
FIGS. 8A to 8C show how the gains of the respective sensor elements Sx, Sy and Sz are measured.
Figure 8B:
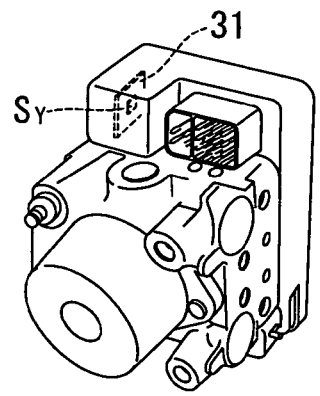
Figure 8C:
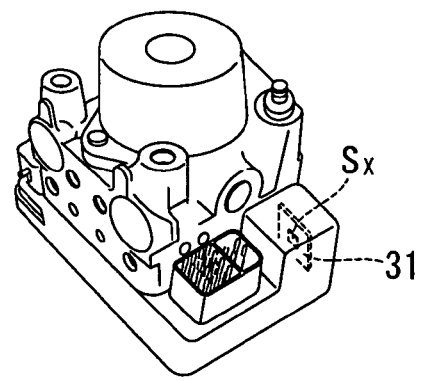

Then, as shown in FIGS. 8B and 8C, with the sensor substrate 31 positioned such that the sensing direction of each of the sensor elements Sx and Sy is parallel to the vertical line, the outputs $Gx_{0-2}$ and $Gy_{0-2}$ of the respective sensor elements Sx and Sy are measured. Since the sensing directions of the respective sensor elements are parallel to the vertical line, the outputs $Gx_{0-2}$ and $Gy_{0-2}$ are both supposed to be "1". But if the outputs $Gx_{0-2}$ and $Gy_{0-2}$ are not "1", they are determined to be gain errors inherent to the respective sensor elements Sx and Sy, which are used as error values $\delta Gx$ and $\delta Gy$ in equations in FIG. 3.

The error values are measured at a site where the sensor elements Sx and Sy are mounted on the sensor substrate 31 such as at an assembly factory for the ECU or the hydraulic unit. If so desired, zero errors and/or gain errors of a yaw rate sensor that is mounted on the sensor substrate 31 may also be measured simultaneously by e.g. setting the sensor substrate parallel to the vertical line so as to correct the output of the yaw rate sensor based on the error values thus measured.

Figure 7A:
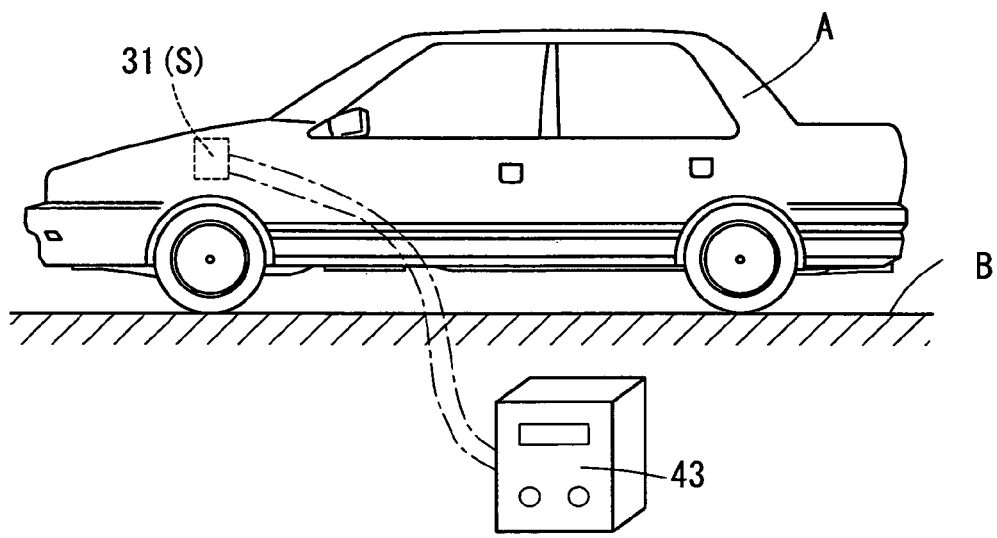
FIG. 7A shows a communication device that sends a signal to the ECU indicating that the vehicle is horizontal.
Figure 7B:
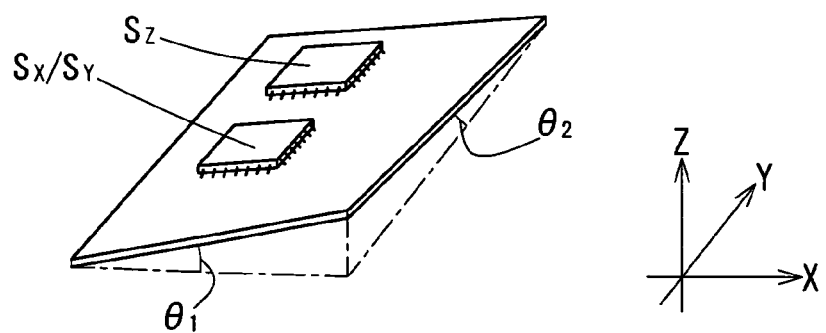
FIG. 7B shows how the sensor elements Sx and Sy are inclined.

The sensor substrate 31 is then mounted on the control substrate 21 in the electronic control unit 2 of the vehicle control device, and the vehicle control device is mounted on a vehicle A. The vehicle A is now placed on a horizontal surface B as shown in FIG. 7A so that both the X-axis and Y-axis directions of the vehicle are perpendicular to the vertical line.

In this state, a signal indicating that the vehicle is horizontal is sent to the electronic control unit 2 of the vehicle control device so that the electronic control unit 2 will recognize that the vehicle is horizontal.

The electronic control unit 2 then calculates, from equations in FIG. 3, the deviation angles $\theta_1$ and $\theta_2$ ($\theta y$ and $\theta x$; see FIG. 7B) of the respective sensor elements about the Y-axis and X-axis based on the outputs $Gx_{2-1}$ and $Gy_{2-1}$ of the sensor elements Sx and Sy and the error values $\delta Gx$ and $\delta Gy$.

Figure 9A:
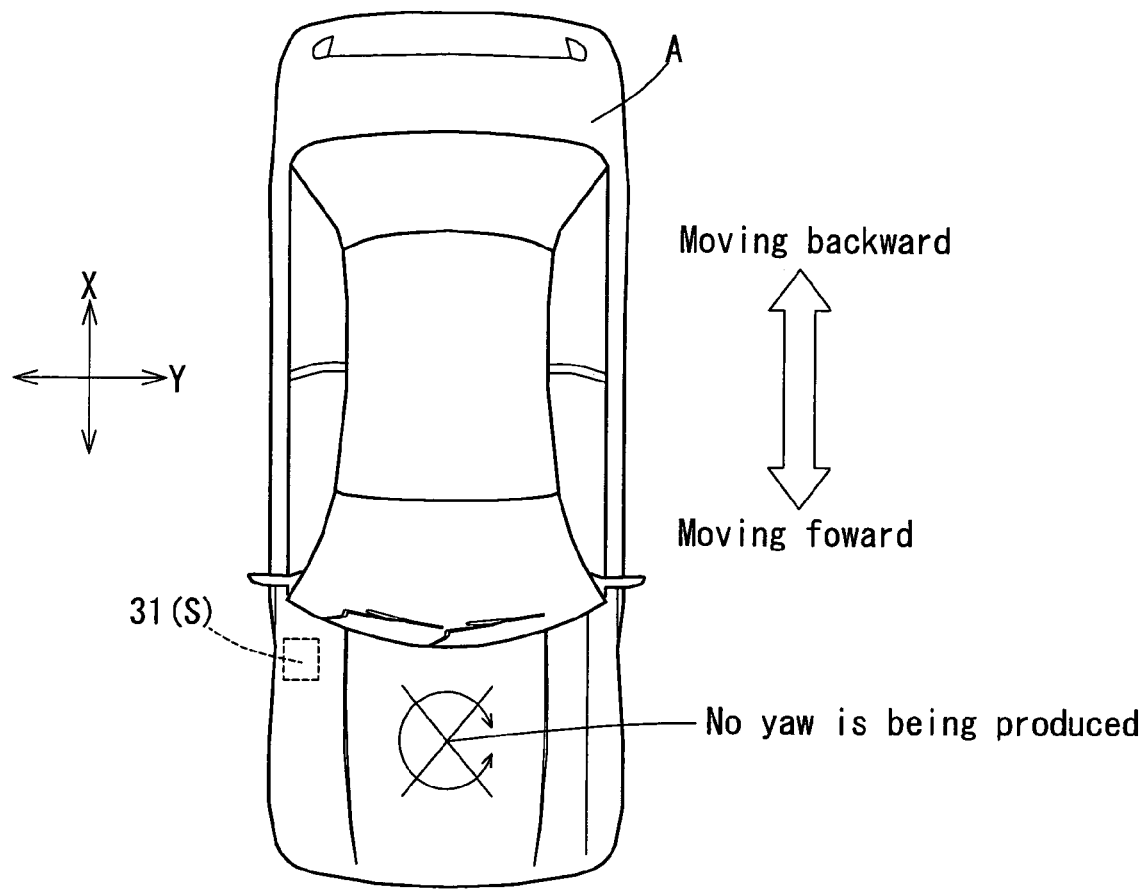
FIG. 9A shows the vehicle of FIG. 7A while traveling in a straight line on a horizontal surface.
Figure 9B:
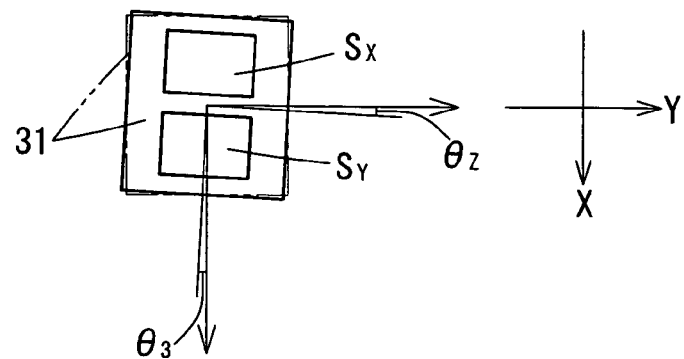
FIG. 9B shows the sensor elements Sx and Sy as mounted on the vehicle with their sensing directions inclined relative to the X-axis and Y-axis directions.

Then, as shown in FIGS. 9A and 9B, while the vehicle is traveling in a straight line on a horizontal surface and thus producing no yaw moment, the acceleration $G_0$ of the vehicle in the X-axis direction is calculated based on signals from wheel speed sensors. Then, based on the acceleration $G_0$, the deviation angles $\theta_1$ and $\theta_2$ ($\theta y$ and $\theta x$) and the outputs of the sensor elements Sx and Sy, the ECU calculates the deviation angle $\theta_3$ ($\theta z$) about the Z-axis from equations (9) and (10) in FIG. 3.

Every time the vehicle is traveling, the deviation angle $\theta z$ may be corrected by e.g. sending commands at intervals of 6 to 8 milliseconds.

While the vehicle is traveling, the ECU calculates, from equations (9) and (10), the true accelerations Gx and Gy of the vehicle in the X-axis and Y-axis directions, respectively, based on the deviation angles $\theta_1$, $\theta_2$ and $\theta_3$ and the outputs of the sensor elements Sx and Sy. Based on the thus calculated true accelerations Gx and Gy of the vehicle, the ECU can accurately control the vehicle A.

The vehicle behavior sensor assembly S may further includes an acceleration sensor element Sz (see FIGS. 5, 6 and 7B) for detecting an acceleration of the vehicle in the Z-axis direction. In this case, the ECU may be configured to detect zero errors, gain errors and the deviation angles $\theta x$, $\theta y$ and $\theta z$ of the sensor element Sz and to calculate, based on these values, the true acceleration Gz from equations (9) and (10). FIGS. 8A to 8C show how the gains of the respective sensor elements Sx, Sy and Sz are measured.

What is claimed is:

1. A method for correcting outputs of a vehicle behavior sensor assembly of a vehicle control device including an electronic control unit, said vehicle behavior sensor assembly comprising a first acceleration sensor element for detecting an acceleration of a vehicle on which said vehicle control device is mounted in an X-axis direction in which the vehicle travels, and a second acceleration sensor element for detecting an acceleration of the vehicle in a Y-axis direction that is perpendicular to the X-axis direction, said electronic control unit being configured to control the behavior of the vehicle based on signals from said first and second acceleration sensor elements:

said method comprising:
mounting said sensor assembly on the vehicle in a predetermined positional relationship relative to the vehicle;
keeping the vehicle in a stationary state with the X-axis and Y-axis directions horizontal;
feeding a signal indicating that the vehicle is horizontal to said electronic control unit;
detecting outputs from said first and second sensor elements, respectively, in response to said signal indicating that the vehicle is horizontal;
calculating first and second deviation angles of sensing directions of said first and second sensor elements about said X-axis direction in a YZ plane that is perpendicular to said X-axis direction and about said Y-axis direction in an XZ plane that is perpendicular to said Y-axis direction based on said outputs from said first and second sensor elements, respectively; and
correcting outputs of said first and second sensor elements based on said calculated first and second deviation angles and while the vehicle is traveling, wherein said sensor assembly is kept in said predetermined positional relationship relative to the vehicle during the correction of said outputs while the vehicle is traveling.

2. The method of claim 1 further comprising detecting a third deviation angle of each of said first and second sensor elements about a Z-axis direction that is perpendicular to both said X-axis and Y-axis directions in an XY plane that is perpendicular to said Z-axis direction, based on said first and second deviation angles, outputs of said first and second sensor elements while the vehicle is traveling in said X-axis direction on a horizontal surface, and one of an acceleration of the vehicle in said Y-axis direction and an acceleration of the vehicle in said X-axis direction as calculated based on signals from wheel speed sensors mounted on the vehicle, while the vehicle is traveling in said X-axis direction on a horizontal surface;
wherein the outputs of said first and second sensor elements while the vehicle is traveling are corrected based on said first, second and third deviation angles.

3. The method of claim 2 further comprising mounting said vehicle behavior sensor assembly on a substrate such that the sensing directions of said first and second sensor elements are parallel to a surface of said substrate, positioning said substrate such that said surface is perpendicular to a vertical line, detecting outputs of said first and second sensor elements as zero errors inherent to said first and second sensor elements, and mounting said substrate on the vehicle, wherein the outputs of said first and second sensor elements while the vehicle is traveling are corrected based on said first, second and third deviation angles, and said zero errors.

4. The method of claim 2 further comprising mounting said vehicle behavior sensor assembly on a substrate such that the sensing directions of said first and second sensor elements are parallel to a surface of said substrate, positioning said substrate such that the sensing direction of each of said first and second sensor elements is parallel to a vertical line, detecting the output of each of said first and second sensor elements as gain errors inherent to said respective first and second sensor elements, and mounting said substrate on the vehicle, wherein the outputs of said first and second sensor elements while the vehicle is traveling are corrected based on said first, second and third deviation angles, and said gain errors.

5. A vehicle control device comprising a hydraulic unit comprising a housing and control valves for pressure increase and pressure reduction mounted in said housing, an electronic control unit as claimed in claim of claim 1, said electronic control unit being coupled to said hydraulic unit to control said control valves, and a vehicle behavior sensor assembly as claimed in claim 1, said vehicle behavior sensor assembly being mounted in said electronic control unit, wherein the outputs of said first and second acceleration sensor elements are corrected by the method of claim 1.

6. The vehicle control device of claim 5 wherein said vehicle behavior sensor assembly is mounted on a substrate which is mounted on a control substrate disposed in a casing of said electronic control unit for controlling said control valves so as to be upright relative to said control substrate.

7. The method of claim 1 further comprising determining gain errors for each of the first acceleration sensor element and the second acceleration sensor element before mounting the sensor assembly on the vehicle and before calculating the first and second deviation angles, the gain errors for the first and second acceleration sensor elements being used to calculate the first and second deviation angles.

8. The method of claim 1 further comprising measuring outputs of the first and second acceleration sensor elements, before mounting the sensor assembly on the vehicle and before calculating the first and second deviation angles, using an acceleration measuring device to determine a gain error for each of the first acceleration sensor element and the second acceleration sensor element, the gain errors for the first and second acceleration sensor elements being used to calculate the first and second deviation angles.

9. The method of claim 1 wherein the vehicle control device, which controls the vehicle by adjusting brake hydraulic pressure, comprises a hydraulic unit, a motor mounted on the hydraulic unit and the electronic control unit mounted on the hydraulic unit, the mounting of the sensor assembly on the vehicle comprising positioning the sensor assembly in a casing of the electronic control unit.

10. The method of claim 1 wherein the vehicle control device, which controls the vehicle by adjusting brake hydraulic pressure, comprises a hydraulic unit, a motor mounted on the hydraulic unit and the electronic control unit mounted on the hydraulic unit, the mounting of the sensor assembly on the vehicle comprising mounting the sensor assembly on a control substrate and positioning the control substrate with the sensor assembly mounted thereon in a casing of the electronic control unit, the control substrate being connected to the motor.

11. The method of claim 1 wherein the vehicle control device, which controls the vehicle by adjusting brake hydraulic pressure, comprises a hydraulic unit, a motor mounted on the hydraulic unit and the electronic control unit mounted on the hydraulic unit, the mounting of the sensor assembly on the vehicle comprising mounting the sensor assembly on a printed circuit board and positioning the printed circuit board with the sensor assembly mounted thereon in a casing of the electronic control unit, the printed circuit board being connected to the motor.

12. The method of claim 1 wherein the mounting of the sensor assembly on the vehicle comprises mounting the sensor assembly on the vehicle which possesses a plurality of wheels.

* * * * *